United States Patent
Naoe

(10) Patent No.: US 11,468,537 B2
(45) Date of Patent: Oct. 11, 2022

(54) OPEN MARKET SYSTEM, METHOD FOR PROVIDING OPEN MARKET, AND PROGRAM

(71) Applicant: JUNGLE X CORP., Tokyo (JP)

(72) Inventor: Fumitada Naoe, Tokyo (JP)

(73) Assignee: JUNGLE X CORP., Tokyo (JP)

( * ) Notice: Subject to any disclaimer, the term of this patent is extended or adjusted under 35 U.S.C. 154(b) by 0 days.

(21) Appl. No.: 17/243,982

(22) Filed: Apr. 29, 2021

(65) Prior Publication Data

US 2021/0248709 A1 Aug. 12, 2021

Related U.S. Application Data

(63) Continuation of application No. PCT/JP2019/044460, filed on Nov. 13, 2019.

(30) Foreign Application Priority Data

Nov. 13, 2018 (JP) ............................. JP2018-213056

(51) Int. Cl.
*G06Q 50/34* (2012.01)
*G06N 20/00* (2019.01)
*G07F 17/32* (2006.01)

(52) U.S. Cl.
CPC .............. *G06Q 50/34* (2013.01); *G06N 20/00* (2019.01); *G07F 17/3288* (2013.01)

(58) Field of Classification Search
None
See application file for complete search history.

(56) References Cited

U.S. PATENT DOCUMENTS

| | | | |
|---|---|---|---|
| 2006/0173667 A1* | 8/2006 | Sumikawa | G06F 30/33 703/14 |
| 2016/0336802 A1* | 11/2016 | Kobayashi | H02J 7/025 |
| 2020/0349438 A1* | 11/2020 | Takamatsu | G06N 20/00 |

FOREIGN PATENT DOCUMENTS

JP 2011-043916 A 3/2011

OTHER PUBLICATIONS

International Search Report dated Feb. 18, 2020 in corresponding International Application No. PCT/JP2019/044460; 6 pages.

* cited by examiner

*Primary Examiner* — Ronald Laneau
(74) *Attorney, Agent, or Firm* — Maier & Maier, PLLC

(57) ABSTRACT

An open market system includes: an information collection circuit that collects prediction information indicating details of a game predicted by prediction sellers; an entry acceptance circuit that accepts entry of tokens possessed by prediction purchasers; an information presentation circuit that presents, to the prediction purchasers who have entered the tokens, the prediction information collected by the information collection circuit and optimum prediction information based on the prediction information; and a distribution execution circuit that distributes, to one or more of the prediction sellers, the tokens entered by one or more of the prediction purchasers for the optimum prediction information.

7 Claims, 4 Drawing Sheets

[Fig.1]
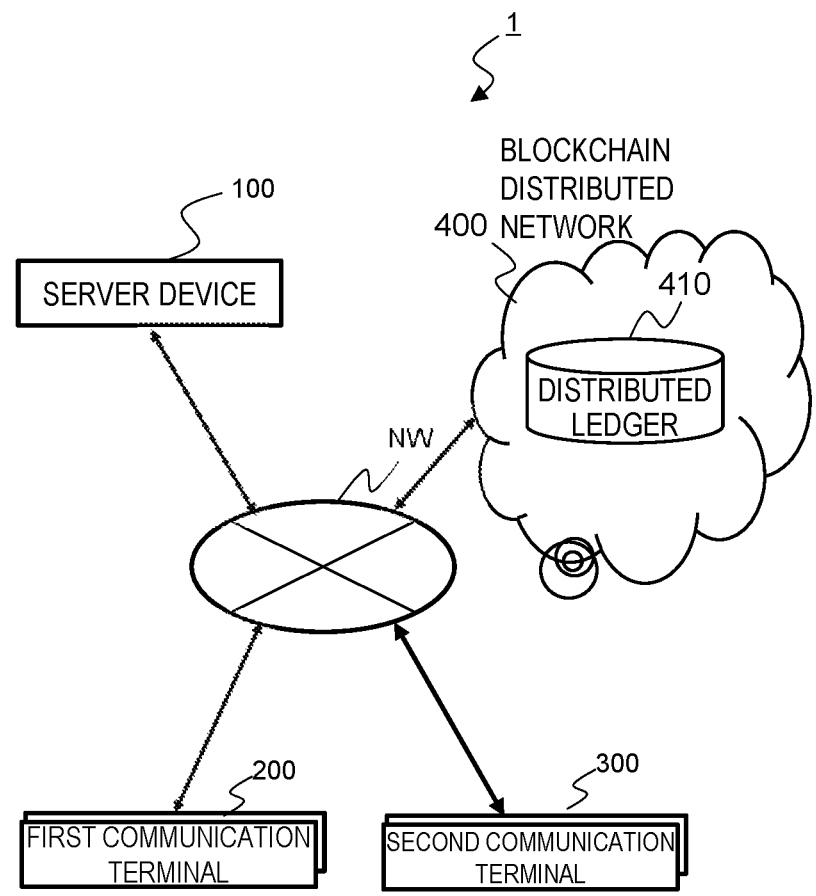

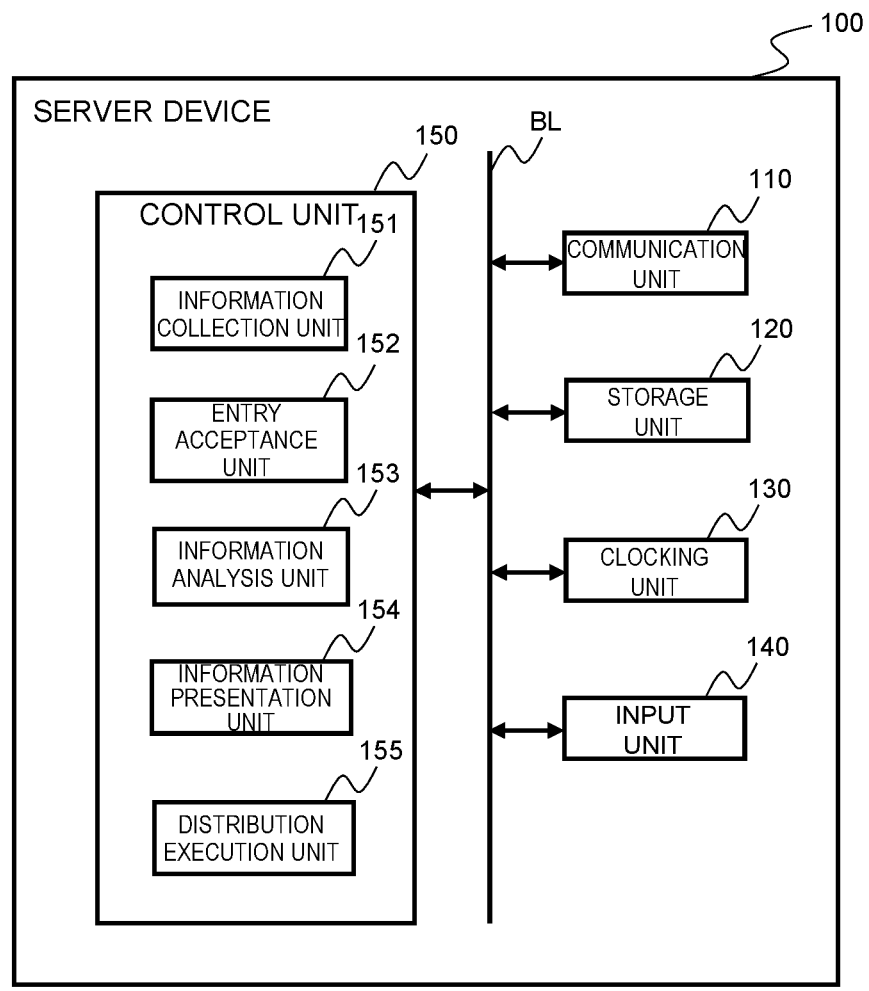

[Fig.3]
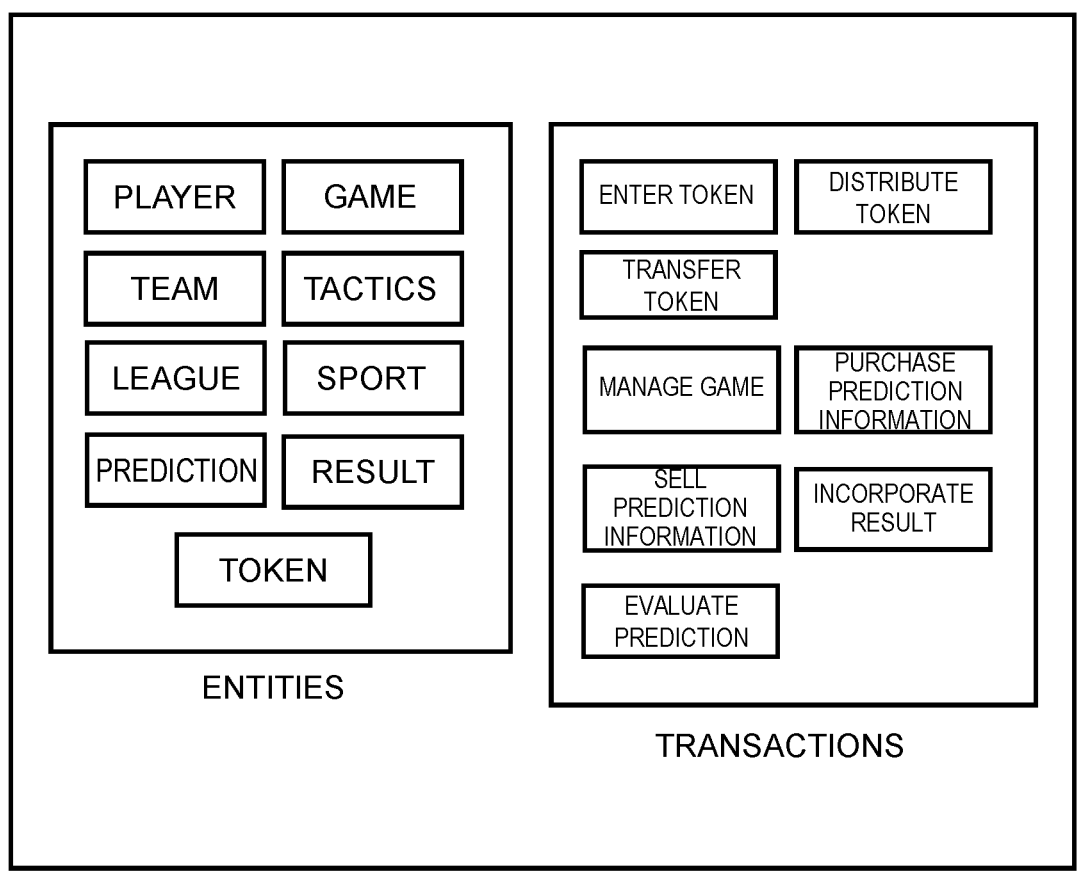
SMART CONTRACT IN BLOCKCHAIN

[Fig.4]
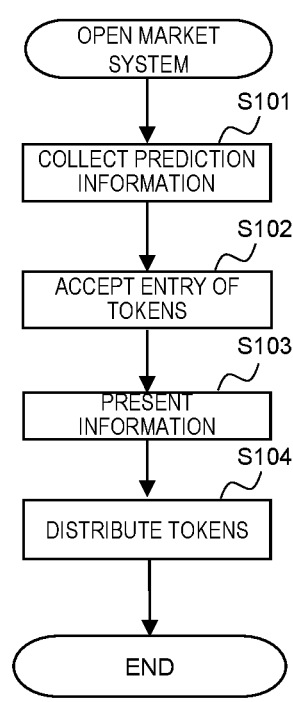

OPEN MARKET SYSTEM, METHOD FOR PROVIDING OPEN MARKET, AND PROGRAM

FIELD

The present disclosure relates to an open market system, a method for providing an open market, and a program.

BACKGROUND

Public sports held by public organizations and on which betting is allowed include horse racing, bicycle racing, motorboat racing, and motorcycle racing. For these public sports, prediction sellers sell their predictions. Systems for prediction sellers to sell their prediction information over a network have been proposed.

For example, Patent Literature 1 discloses an open market system that intermediates between selling predictions and purchasing predictions. This system calculates performance data including the correct-prediction rate, the recovery rate, the recovery figure, and the sales figure, which are the "performance" of a prediction made by a prediction seller (a seller). The system provides the performance data to a prediction purchaser (a buyer) along with the prediction seller's prediction information.

PATENT LITERATURE

Patent Literature 1: Japanese Patent Laid-Open No. 2011-43916

SUMMARY

Patent Literature 1 indicates that, because the performance is calculated by a server device, information more trustworthy than the prediction seller's self-reported performance can be provided to the prediction purchaser. The prediction purchaser, however, can only trust the information provided by the server device, which means low transparency and neutrality of prediction information transactions. For example, if the manager of the server device or a malicious user tampers with the performance information, the prediction purchaser cannot know that. The information provided is therefore less trustworthy.

The open market system in Patent Literature 1 is directed to prediction about public sports such as horse racing and bicycle racing. The system cannot be applied to common sports such as soccer and baseball and therefore is less versatile. For example, prediction about public sports is typically prediction on the order of finish in a race, rather than prediction on game details such as winning or losing the game, the score, the score difference, who scores points (a particular player's performance), and the team formation.

Minor sports may receive only a few predictions, preventing conventional analysis methods from successfully ensuring the accuracy of the optimum prediction. By contrast, if an enormous number of predictions are sold, conventional analysis methods cannot successfully derive the optimum prediction in real time. The optimum prediction preferably represents the trend of prediction at the time of calculation and therefore requires fast calculation. Patent Literate 1 does not disclose solutions to these problems.

As above, the open market system in Patent Literature 1 is less convenient for users from various viewpoints.

In view of the above circumstances, an object of the present disclosure is to provide an open market system and other aspects convenient for users.

To accomplish the above object, an open market system according to a first aspect of the present disclosure is characterized by including: an information collection circuit that collects prediction information indicating details of a game predicted by prediction sellers; an entry acceptance circuit that accepts entry of tokens possessed by prediction purchasers; an information presentation circuit that presents, to the prediction purchasers who have entered the tokens, the prediction information collected by the information collection circuit and optimum prediction information based on the prediction information; and a distribution execution circuit that distributes, to one or more of the prediction sellers, the tokens entered by one or more of the prediction purchasers for the optimum prediction information.

To accomplish the above object, a method for providing an open market according to a second aspect of the present disclosure is characterized by including: an information collection step of collecting prediction information indicating details of a game predicted by prediction sellers; an entry acceptance step of accepting entry of tokens possessed by prediction purchasers; an information presentation step of presenting, to the prediction purchasers who have entered the tokens, the prediction information collected in the information collection step and optimum prediction information based on the prediction information; and a distribution execution step of distributing, to one or more of the prediction sellers, the tokens entered by one or more of the prediction sellers for the optimum prediction information.

To accomplish the above object, a computer program product according to a third aspect of the present disclosure causes a computer program product to function as: information collection circuit for collecting prediction information indicating details of a game predicted by prediction sellers; entry acceptance circuit for accepting entry of tokens possessed by prediction purchasers; information presentation circuit for presenting, to the prediction purchasers who have entered the tokens, the prediction information collected by the information collection circuit and optimum prediction information based on the prediction information; and distribution execution circuit for distributing, to one or more of the prediction sellers, the tokens entered by one or more of the prediction purchasers for the optimum prediction information.

According to the present disclosure, an open market system and other aspects convenient for users can be provided.

BRIEF DESCRIPTION OF DRAWINGS

FIG. 1 is a diagram illustrating an exemplary configuration of an open market system according to an embodiment.

FIG. 2 is a block diagram illustrating an exemplary configuration of a server device according to the embodiment.

FIG. 3 is a conceptual diagram illustrating elements of a distributed ledger.

FIG. 4 is a flowchart illustrating exemplary operations of the server device according to the embodiment.

DETAILED DESCRIPTION

An embodiment of the present disclosure will be described below with reference to the drawings. The embodiment to be described below is not intended to unnecessarily limit the scope of the present disclosure set forth in the claims. Not all of the elements described in the embodiment are essential for the present disclosure.

(Embodiment)

As illustrated in FIG. 1, an open market system 1 according to this embodiment includes a server device 100, one or more first communication terminals 200, one or more second communication terminals 300, and a blockchain distributed network 400. The server device 100, the first communication terminals 200, and the second communication terminals 300 are communicatively connected to each other over a network NW. The network NW is a world area network (WAN), for example. Other server devices (not shown) may be connected to the network NW as necessary, such as server devices used by related services involved in cryptocurrency, electronic payment, incentives, and Internet live broadcast.

The server device 100 is managed by a service provider that provides an open market to users (prediction sellers and prediction purchasers). Over the network NW, the server device 100 accepts tokens entered by prediction purchasers, and provides, to the prediction purchasers, prediction information collected from prediction sellers and optimum prediction information based on the prediction information collected.

In this embodiment, an example will be described in which the server device 100 performs most of the processing. However, as will be described below, the functions of the server device 100 may be implemented by the blockchain distributed network 400. That is, any one or more of the server device 100, the first communication terminals 200, and the second communication terminals 300 in the open market system 1 may perform distributed management in the blockchain distributed network 400 to implement the functions of the server device 100.

The first communication terminals 200 are used by the prediction sellers. The second communication terminals 300 are used by the prediction purchasers. The prediction sellers and the prediction purchasers are fans of a sport, such as supporters or spectators.

The prediction sellers predict the details of a game and sell their predictions. The prediction purchasers use tokens to purchase information on the predictions on the game details. The game for which the predictions are sold may be a game on which bookmakers offer bets, or a unique game held by the operator of the open market. The game is not limited to an athletic sport game but may be a gaming competition for competing in intelligence, luck, or operational ability.

If the game is a drone obstacle race, the details on which the predictions are made may include the order of finish in the race, the best record, whether a particular competitor can clear a particular obstacle, the best record in clearing a particular obstacle or in running through a particular section, who achieves the best record, the order of passing a particular point in the course, and an accident (a malfunction or a collision) during the game. The game and details are not limited to those illustrated herein.

The first communication terminals 200 and the second communication terminals 300 are terminals having a communication function, for example, personal computers, tablet terminals, smartphones, head-mounted displays, and VR goggles. In this embodiment, each first communication terminal 200 used by a prediction seller is separate from each second communication terminal 300 used by a prediction purchaser. These terminals, however, may be integrated into a communication terminal capable of both selling predictions and purchasing predictions, allowing use by both the prediction seller and the prediction purchaser.

Legal systems in some countries (e.g., current Japan) may restrict betting based on direct prediction. In such cases, the prediction information may be sold by users in an area in which betting based on direct prediction is restricted, and may be purchased by users in an area in which betting based on direct prediction is allowed.

A distributed ledger 410 resides in the blockchain distributed network 400 connected to the network NW. The distributed ledger 410 is managed using the blockchain technology.

<Configuration of Server Device>

The configuration of the server device 100 will be described in detail below. As illustrated in FIG. 2, the server device 100 includes: a communication circuit 110 that communicates with other devices; a storage circuit 120 that stores various sorts of data; a clocking circuit 130 that clocks time; an input circuit 140 that receives the manager's input; and a control circuit 150 that controls the entire device. These components are interconnected via a bus line BL.

The communication circuit 110 is a communication interface that includes a network interface card controller (NIC) for wired or wireless communication. The communication circuit 110 communicates with the first communication terminals 200 and the second communication terminals 300 over the network NW.

The storage circuit 120 may include random access memory (RAM) and read only memory (ROM). The storage circuit 120 stores programs for performing various control processes, and various sorts of data. The open market system 1 may store the data in the distributed ledger 410 rather than in the storage circuit 120, thereby allowing the first communication terminals 200 and the second communication terminals 300 to overwrite the stored data.

The clocking circuit 130 includes an oscillation circuit and a variable phase locked loop (PLL) for generating a clock signal, and a counter circuit for counting the number of pulses of the clock signal. The clocking circuit 130 clocks time based on the number of pulses counted.

The input circuit 140 includes an interface for receiving the manager's input, for example, operation buttons or a keyboard. The input circuit 140 may be configured to receive the manager's input based on speech recognition. The manager may be a sport-related person rather than the service provider. For example, the sport-related person may input results corresponding to the users' predictions while watching the progress of the game.

The control circuit 150 may include a central processing circuit (CPU). The control circuit 150 executes programs stored in the storage circuit 120 to control the general operation of the server device 100. The control circuit 150 performs various sorts of control according to the timing based on the number of pulses counted by the clocking circuit 130. The control circuit 150 also performs, based on the time clocked by the clocking circuit 130, processes such as obtaining the time at which tokens are entered by a user and the time at which prediction information is received from a user, and managing an elapsed time and a time limit.

The functional configuration of the control circuit 150 will be described below. The control circuit 150 functions as an information collection circuit 151, an entry acceptance circuit 152, an information analysis circuit 153, an information presentation circuit 154, and a distribution execution circuit 155. Any one or more of these functions may be implemented by the blockchain distributed network 400 instead of the server device 100.

The information collection circuit 151 collects prediction information that indicates the details of the game predicted by the prediction sellers. Specifically, the information collection circuit 151 receives the prediction information from the first communication terminals 200 via the communication circuit 110. The prediction information is stored in the storage circuit 120 or the distributed ledger 410.

The entry acceptance circuit 152 accepts purchase of tokens by the prediction purchasers and entry of tokens possessed by the prediction purchasers. The entry acceptance circuit 152 relies on a smart contract to receive entry instructions from the second communication terminals 300 via the communication circuit 110. The tokens may be a divisible and exchangeable cryptocurrency in a blockchain (e.g., ERC20 tokens in Ethereum) or may simply be points convertible from a currency.

Multiple types of tokens may be used. Different types of tokens may be used for different purposes, or may be used for the same purpose but with different weights.

A prediction purchaser can enter tokens to purchase two types of information: individual prediction information and optimum prediction information. If the prediction purchaser enters tokens to purchase individual prediction information, the tokens entered are transferred to the prediction seller of the prediction information upon the purchase. Alternatively, the tokens do not need to be transferred upon the purchase but may be scheduled to be transferred later.

If the prediction purchaser purchases optimum prediction information, the tokens entered are distributed to one or more prediction sellers after the results of their predictions come out. The tokens may be distributed based on the correctness of the prediction information (the degree of contribution to the optimum prediction information) or the most recent performance ranking. That is, the tokens entered for purchasing the optimum prediction information is pooled until the results of the predictions come out.

All or some of the tokens collected may be distributed to the prediction sellers. For example, some of the tokens collected may be distributed to the platform provider as a monthly usage fee for the platform or to sport-related persons (such as players, coaches, the team manager, and sponsors), and the rest of the tokens may be distributed to the prediction sellers.

The information analysis circuit 153 uses machine learning to analyze the prediction information collected and the past performances of the prediction sellers who made the predictions, thereby generating the optimum prediction information. The optimum prediction information may be obtained by statistically analyzing the whole picture of all the prediction information collected, or by extracting prediction information provided by highly ranked prediction sellers who predicted with high accuracy. The machine learning preferably uses sparse modeling techniques, for example.

Minor sports may receive only a few pieces of prediction information. Sparse modeling techniques enable features to be extracted from the data on such a few pieces of prediction information and to be analyzed. This facilitates ensuring the accuracy of the optimum prediction. In some cases, an enormous number of pieces of prediction information may be sold. Sparse modeling techniques start analysis when the amount of data is still small, and therefore can derive the optimum prediction in real time from a large amount of data that has gradually increased.

The information presentation circuit 154 presents the prediction information collected by the information collection circuit 151, and the optimum prediction information based on the prediction information collected, to the prediction purchasers who entered tokens for these pieces of information. The information presentation circuit 154 also presents, to the prediction sellers, information such as a prediction information input form and prediction-related game information. The information presentation circuit 154 presents information by transmitting the information to the first communication terminals 200 and the second communication terminals 300 via the communication circuit 110.

If a prediction purchaser enters tokens to purchase only a prediction seller's prediction information, the prediction purchaser can view the prediction information. The optimum prediction information may be presented to be viewable entirely, partially, or in an abstracted form.

If a prediction purchaser enters tokens to purchase only the optimum prediction information, the prediction purchaser can view the optimum prediction information. The prediction sellers' prediction information may be presented to be viewable entirely, partially, or in an abstracted form. The optimum prediction information may be updated or remain unchanged after being purchased.

A prediction purchaser may enter tokens to purchase both the prediction information and the optimum prediction information. The prediction purchaser can then view both pieces of information.

Based on token history information, the information presentation circuit 154 may present, to the prediction purchasers, performance information indicating the sales/purchase performance of the prediction information. The token history information may be based on the blockchain technology. This ensures the transparency and neutrality of the sales/purchase performance of the prediction information.

The distribution execution circuit 155 distributes, to relevant prediction sellers, tokens entered by one or more prediction purchasers for the optimum prediction information. The distribution execution circuit 155 distributes the tokens to the prediction sellers according to the prediction sellers' prediction information sales performances or correctness performances. Token distribution records may be disclosed based on the blockchain technology. This ensures the transparency and neutrality of the method of distributing tokens.

The distribution execution circuit 155 may distribute the tokens to the prediction sellers based on prediction accuracies calculated from the prediction sellers' most recent prediction information correctness performances. For example, the tokens may be distributed to only a predetermined number of highly ranked prediction sellers, or may be distributed as dividends proportional to the prediction accuracies.

Thus, the example in which the server device 100 performs most of the processing has been described. Now, the distributed ledger 410 for performing distributed management in the blockchain distributed network 400 will be described. FIG. 3 is a conceptual diagram illustrating elements of the distributed ledger.

The distributed ledger includes entities and transactions. The entities represent multiple pieces of data, and the transactions are information representing operations to be performed on these pieces of data. Acquiring the entities and performing the transactions are both implemented as a smart contract in the blockchain. It is to be noted that the information analysis circuit 153 for generating the optimum prediction information is preferably provided in the server device 100 rather than in the blockchain distributed network 400.

Each entity typically includes minimum data, such as an identifier and a timestamp. In addition, data on identifier relationships, games, tactics, predictions, the results of the predictions, etc., is held in the blockchain. The identifier relationships have a hierarchical structure that associates the sport, leagues, and the teams and players that participate in the games.

Sport data is held outside the blockchain. The sport data includes: information that is set by the operator, such as player names, team names, profiles, event names, and venues; numerical data such as scores, winning and losing, and winning percentages; and image data such as team icons and player photographs. For example, these items are input by the manager or the market operator to the server device 100 and stored in the server device 100.

The blockchain includes the entities to which tokens are to be transferred, and the transactions involving token transfer between entities. For example, the entities include: hierarchical data including data on the sport, leagues, teams, and players; games, tactics, predictions, and the results of the predictions; each user's role (membership in a particular team, and rights granted in the team); and each user's state (e.g., the token possession state).

The transactions include, for example: viewing of sport data by users (prediction sellers and prediction purchasers) and by sport-related persons; entry of tokens by users; purchasing and selling of prediction information by users; and token transfer resulting from the purchasing and selling of the prediction information. The transactions also include: game management by the organizer (the market operator); registration of game results (incorporation of results); prediction evaluation based on the incorporated results; and token distribution based on the prediction evaluation.

<Process Flow>

Exemplary operations of the open market system 1 will be described with reference to FIG. 4. The following description assumes that, before these operations, the manager or the market operator registers, in the server device 100 or the distributed ledger 410, information such as a list of scheduled games, choices indicating predicted details, and a prediction information input form. The following description also assumes that the prediction purchasers purchase and possess tokens in advance.

These operations may be performed by the server device 100 or the blockchain distributed network 400. The following describes the details of the operations as performed by the open market system 1, which includes both the server device 100 and the blockchain distributed network 400.

First, the open market system 1 collects prediction information indicating the details of a game predicted by prediction sellers (step S101). Specifically, the open market system 1 presents, to the second communication terminals 200 used by the prediction sellers, information necessary for prediction and an input form for inputting the prediction information. The open market system 1 collects, from the second communication terminals 200, the prediction information input by the prediction sellers. The open market system 1 uses machine learning to analyze the prediction information collected and the prediction sellers' past performances, thereby generating optimum prediction information.

The open market system 1 accepts entry of tokens possessed by prediction purchasers (step S102). The open market system 1 accepts the entry of tokens by receiving entry instructions from the second communication terminals 300.

Entering tokens is transferring tokens in the blockchain (a smart contract). The prediction purchasers enter tokens to purchase the prediction information or the optimum prediction information. In purchasing, a prediction information list and information on the optimum prediction information are presented on the second communication terminals 300. At this point, performance information indicating the sales/purchase performances of the prediction information may be presented based on token history information.

The tokens of the prediction purchasers who purchase the prediction information are transferred to the prediction sellers who sell the prediction information. The tokens entered to purchase the optimum prediction information are pooled.

The open market system 1 presents information on the prediction information and/or the optimum prediction information (step S103). Specifically, among the pieces of prediction information collected, the open market system 1 presents a purchased piece of prediction information to the second communication terminal 300 used by each prediction purchaser who has entered the tokens therefor. The open market system 1 also presents the purchased optimum prediction information generated based on the prediction information to the second communication terminal 300 used by each prediction purchaser who has entered the tokens therefor.

After the results of the predictions come out, the open market system 1 distributes, to one or more prediction sellers, the tokens entered by one or more prediction sellers for the optimum prediction information and pooled (step S104). The tokens may be distributed according to the prediction sellers' prediction information sales performances or correctness performances, or may be distributed based on prediction accuracies calculated from the prediction sellers' most recent prediction information correctness performances.

<Advantageous Effects>

In the open market system 1 according to this embodiment, the performance information on the prediction sellers is presented to the prediction purchasers. Because the performance information is based on the token history information (the blockchain), the information is highly transparent and neutral. The information provided to the prediction purchasers is therefore highly trustworthy.

In the open market system 1 according to this embodiment, what is predicted is game details, such as winning or losing the game, the score, the score difference, who scores points (a particular player's performance), and the team formation. The open market system 1 is therefore versatile and is applicable to not only public sports but also other common sports such as soccer and baseball.

The optimum prediction information provided by the open market system 1 is obtained by using machine learning to extract features of the prediction information collected and features of the past performances of the prediction sellers who predicted the prediction information collected. The machine learning uses sparse modeling techniques. This enables fast and accurate deriving of the optimum prediction irrespective of the number of predictions.

Thus, the open market system is convenient for users from various viewpoints.

While the description of the embodiment thus concludes, the above embodiment is merely exemplary. Detailed configurations and processes of the open market system 1 are not limited to what has been described in the above embodiment.

The functions of the open market system 1 according to the present disclosure may be implemented by, for example, a computer executing a program rather than by the above-described devices. The program for implementing the functions of the open market system 1 may be stored on a computer-readable recording medium, such as a universal serial bus (USB) memory, compact disc-read only memory (CD-ROM), digital versatile disc (DVD), or hard disc drive (HDD), or may be downloaded to the computer over a network.

While a preferred embodiment of the present disclosure has been described above, the present disclosure is not limited to the specific embodiment but encompasses the scope of the features set forth in the claims and of their equivalents. The configurations of the devices described in the above embodiment and variations can be appropriately combined as long as technically consistent.

REFERENCE SIGNS LIST

1 open market system
100 server device
200 first communication terminal
300 second communication terminal
110 communication circuit
120 storage circuit
130 clocking circuit
140 input circuit
150 control circuit
151 information collection circuit
152 entry acceptance circuit
153 information analysis circuit
154 information presentation circuit
155 distribution execution circuit
400 blockchain distributed network
410 distributed ledger

The invention claimed is:

1. An open market system comprising:
an information collection circuit that collects prediction information indicating details of a game predicted by prediction sellers from one or more of a first plurality of communication terminals;
an entry acceptance circuit that accepts entry of tokens possessed by prediction purchasers from a second plurality of communication terminals;
an information presentation circuit that presents in real time during the game, to the second plurality of communication terminals of the prediction purchasers who have entered the tokens, the prediction information collected by the information collection circuit and optimum prediction information formulated based on the prediction information; and
a distribution execution circuit that distributes, to one or more of the prediction sellers, the tokens entered by one or more of the prediction purchasers for the optimum prediction information.

2. The open market system according to claim 1, wherein the optimum prediction information results from using machine learning to analyze the prediction information collected and past performances of the prediction sellers.

3. The open market system according to claim 2, wherein the information presentation circuit presents, to the prediction purchasers, performance information based on token history information, the performance information indicating sales/purchase performance of the prediction information.

4. The open market system according to claim 1, wherein the distribution execution circuit distributes the tokens to the prediction sellers according to sales performances or correctness performances of the prediction information of the prediction sellers.

5. The open market system according to claim 1, wherein the distribution execution circuit distributes the tokens to the prediction sellers based on prediction accuracies calculated from most recent correctness performances of the prediction information of the prediction sellers.

6. A method for providing an open market executed by a computer including the control circuit, comprising:
an information collection step of collecting prediction information indicating details of a game predicted by prediction sellers from one or more of a first plurality of communication terminals;
an entry acceptance step of accepting entry of tokens possessed by prediction purchasers from a second plurality of communication terminals;
an information presentation step of presenting in real time during the game, to the second plurality of communication terminals of the prediction purchasers who have entered the tokens, the prediction information collected in the information collection step and optimum prediction information based on the prediction information; and
a distribution execution step of distributing, to one or more of the prediction sellers, the tokens entered by one or more of the prediction sellers for the optimum prediction information.

7. A computer program product, comprising:
information collection circuit for collecting prediction information indicating details of a game predicted by prediction sellers from one or more of a first plurality of communication terminals;
entry acceptance circuit for accepting entry of tokens possessed by prediction purchasers from a second plurality of communication terminals;
information presentation circuit for presenting in real time during the game, to the second plurality of communication terminals of the prediction purchasers who have entered the tokens, the prediction information collected by the information collection circuit and optimum prediction information based on the prediction information; and
distribution execution circuit for distributing, to one or more of the prediction sellers, the tokens entered by one or more of the prediction purchasers for the optimum prediction information.

* * * * *